United States Patent Office.

PETER ROOSEN, OF OESTRICH, GERMANY, ASSIGNOR TO RUDOLPH KOEPP & CO., OF SAME PLACE.

PROCESS OF MAKING LACTIC ACID.

SPECIFICATION forming part of Letters Patent No. 584,707, dated June 15, 1897.

Application filed November 2, 1896. Serial No. 610,878. (Specimens.)

*To all whom it may concern:*

Be it known that I, PETER ROOSEN, a subject of the Emperor of Germany, and a resident of Oestrich-on-the-Rhine, Germany, have invented certain new and useful Improvements in the Manufacture of Lactic Acid, of which the following is a specification.

The production of a considerable quantity of lactic acid when concentrated potash or soda acts upon invert sugar has been observed by Kiliani. (*Reports of the German Chemical Society*, 15, 136, 699.) Invert sugar also yields a small quantity of lactic acid, together with other products, when treated with lime-water at ordinary temperatures. (*Reports*, 15, 701.) Cane-sugar, even when heated for forty-eight hours with milk of lime, yields only one per cent. of lactic acid, (*Annalen der Chemie*, 255, 225,) while Schutzenberger, by the action of baryta on cane-sugar at 150° to 160°, obtained sixty per cent. of lactic acid. (*Bulletin de la Societé Chimique*, 25, 289.) All these methods, however, are unsuited to the technical production of lactic acid, partly on account of the small yield of the substance and in some measure because of the large consumption of alkalies and baryta which they demand.

I have discovered that a highly satisfactory yield of lactic acid is produced when the carbohydrates are treated under pressure with milk of lime at temperatures above 100° centigrade, not less than 130° centigrade. According to this invention dextrose, levulose, invert sugar, cane-sugar, starch-syrup, molasses, maltose, sweet starch, dextrin, gum-wood, and wood extract are treated with milk of lime in autoclaves at temperatures above 100° centigrade. The hydrolysis of the carbohydrates proceeds rapidly at 150° centigrade and above, but more slowly at less elevated temperatures. In the place of carbohydrates, their compounds with bases, the so-called "saccharates" may be employed in the case of calcium. Saccharates water alone may be used instead of milk of lime, advantage being taken of the lime already present in the substance. The product of the reaction is extracted by means of hot water, the solution concentrated by evaporation, and the calcium lactate decomposed by means of sulfuric or oxalic acid. The solution of lactic acid obtained by precipitating the lime can then be concentrated by evaporation.

In order to obtain pure lactic acid, the crude lactate is first purified by crystallization or extraction by means of wood-spirit or ethylic alcohol and then decomposed by means of sulfuric or oxalic acid. Lactic acid obtained in this way is of greater purity than the product obtained by fermentation. It also lacks the disagreeable penetrating smell of butyric and valeric acids.

I claim—

The process of manufacturing pure lactic acid from lactate of lime which consists in heating carbohydrates with water in the presence of lime in a closed vessel at a temperature not less than 130° centigrade, substantially as described.

In testimony whereof I have signed my name to this specification in the presence of two subscribing witnesses.

PETER ROOSEN.

Witnesses:
FRANZ HASSLACHER,
MICHAEL VOLK.